April 27, 1965 F. A. KROHM 3,180,758
METHOD OF WIPING A CURVED SURFACE
Original Filed Oct. 19, 1955 7 Sheets-Sheet 1

INVENTOR.
FRED A. KROHM
BY H. P. Settle Jr.
Wesley B. Taylor
Charles S. Penfold
ATTORNEYS April 27, 1965 F. A. KROHM 3,180,758
METHOD OF WIPING A CURVED SURFACE
Original Filed Oct. 19, 1955 7 Sheets-Sheet 2

INVENTOR.
FRED A. KROHM
BY H. P. Settle, Jr.
Wesley B. Taylor
Charles S. Penfold
ATTORNEYS April 27, 1965  F. A. KROHM  3,180,758
METHOD OF WIPING A CURVED SURFACE
Original Filed Oct. 19, 1955  7 Sheets-Sheet 5

INVENTOR.
FRED A. KROHM
BY H. P. Settle Jr.
Wesley B. Taylor
Charles S. Penfold
ATTORNEYS April 27, 1965 F. A. KROHM 3,180,758
METHOD OF WIPING A CURVED SURFACE
Original Filed Oct. 19, 1955 7 Sheets-Sheet 6

INVENTOR.
FRED A. KROHM
BY H. P. Settle Jr.
Wesley B. Taylor
Charles S. Penfold
ATTORNEYS April 27, 1965     F. A. KROHM     3,180,758
METHOD OF WIPING A CURVED SURFACE
Original Filed Oct. 19, 1955     7 Sheets-Sheet 7

INVENTOR.
FRED A. KROHM
BY H. P. Settle Jr.
Wesley B. Taylor
Charles S. Penfold
ATTORNEYS

United States Patent Office 3,180,758
Patented Apr. 27, 1965

3,180,758
METHOD OF WIPING A CURVED SURFACE
Fred A. Krohm, Hobart, Ind., assignor to The Anderson Company, a corporation of Indiana
Continuation of abandoned application Ser. No. 541,491, Oct. 19, 1955. This application Nov. 30, 1959, Ser. No. 856,082
16 Claims. (Cl. 134—6)

The present invention relates to a method of wiping a curved surface and, more particularly, to a method of wiping the outer surface of an irregularly curved windshield.

This application is a continuation of my application Serial No. 541,491, filed October 19, 1955, which was in turn a continuation-in-part of my application Serial No. 424,647, filed April 21, 1954, both applications now being abandoned.

For many years, the cleaning or wiping of an automobile windshield was a more simple matter than met today in that the surface of the windshield was flat. The method of wiping such a flat surface consisted primarily of oscillating an arm about one end and scrubbing a wiping blade, attached to the other end of the arm, through an arcuate path across the flat windshield surface. Although important developments in this art have taken place in improved construction of arms, blades, and connectors therefor, the method of operating wiper assemblies across a windshield surface has remained in actual practice substantially the same.

Within recent years, automobile manufacturers have introduced curved windshields. Initially, the lateral curvature was slight and served primarily to eliminate the windshield center post. More recently, the curvature has become greater, and in addition severely curved or swept-back end sections have been employed, giving rise to the expression "wrap-around" windshields since the curvature of the end sections is substantially in a horizontal plane or direction.

Prior methods of wiping a windshield embodying an arm and a blade of a type previously mentioned are completely unsuited for effectively wiping a severely and irregularly curved windshield. Many defects result. For one, the wiper blade alone cannot conform to or accommodate the extreme curvature of the windshield at its swept-back lateral edges, and sections of the wiper blade actually leave the windshield surface, thereby affording no wipe at all at the edges of the windshield. Additionally, even those sections which remain in contact with the surface may cease to provide an effective wiping action. For example, an effective wipe is obtained when the wiping element, such as a rubber blade, provides what is termed in the art as a squeegee action. The blade wiping edge must be substantially normal or "erect" to the windshield surface to adequately wipe the surface. In wiping appreciably curved windshields by prior methods, the blade wiping edge does not lie substantially erect to the windshield surface and the proper squeegee action is not obtained, particularly as the wiper blade traverses the more severely curved end sections.

Another disadvantage of using prior methods to wipe present-day windshields is that chatter and actual scratching of the glass surface may result. Again, these shortcomings particularly appear at the laterally curved end or "wrap-around" section where the surface recedes from the pivot axis of the arm so rapidly. The wiping attitude of the blade to the glass is so incorrect that chatter follows. Additionally, the metal holder for the wiping blade may actually contact the surface and scratch it during movement thereacross, as the blade fails to remain erect with respect to the surface.

In contrast to the foregoing, the present method effectively wipes a curved windshield and especially those of the "wrap-around" type. It has been discovered that in order to obtain an effective wiping action across an irregularly curved windshield with an arm and a blade, the relation between these two parts must be an almost constantly changing one for at least part of the travel of the blade. To provide an effective wipe pattern throughout a maximum surface area of the windshield, the present method contemplates substantially three primary and distinct steps in each of which the relation between the arm and blade is different.

For example, in one form of the method, arbitrarily starting with the arm and blade in the parking position, the first step comprises pivoting the arm to move the blade across a windshield surface in an arcuate path and toward an end section to a position of substantial parallelism with the vertical elements of the surface. During this movement, the angle between the axes of the arm and blade can be substantially constant. In the second step, the blade is maintained in substantial parallelism with the vertical elements of the surface to continue an effective wipe. In this area, the angular relation between the blade and the arm must be constantly changing to realize this positioning of the blade. In the third step, the blade is tilted in the direction of its movement. This maintains the blade erect against the surface and is particularly effective on a horizontally curved end section or on those windshields having a "wrap-around" end section. Steps two and three can be performed simultaneously, if desired.

When the windshield surface is curved in a transverse direction, the present method may also include a step of resiliently flexing the outer ends of the wiper blade away from the arm to present a concave wiping surface. This enables the blade to conform readily with the curvature of any area traversed regardless of its direction of curvature.

It is, therefore, a primary object of the present invention to provide a method of cleaning a surface of irregular curvature.

Another object is to provide a method of wiping a windshield surface having lateral marginal portions of appreciable curvature.

A further object is to provide a method of wiping a windshield surface with an arm and blade wherein the angular relation between the arm and the blade is varied to maintain the blade in full longitudinal contact and in proper wiping attitude with respect to the windshield surface.

A still further object is to provide a method of wiping a "wrap-around" windshield surface with an arm and blade wherein the angular relation between the arm and blade is changed, and the blade is tilted with respect to the arm simultaneously with the change in angular relation.

Yet another object of the invention is to provide a method of wiping a "wrap-around" windshield surface with an arm and blade by supplying the arm with superposed parts having overlying offset portions and pivoting the parts relatively to each other about an axis passing through the offset portions to change the angular relation between the arm and blade and tilt the blade with respect to the arm and maintain it substantially erect against the windshield surface.

Other objects are apparent from the following description of the invention and the appended drawings.

On the drawings:

FIGURE 2 is a sectional view taken along the plane II—II of FIGURE 1;

As shown on the drawings:

FIGURES 2 through 6 illustrate one form of the apparatus which may be used in practicing the present method, and FIGURES 1 and 7 through 14 show various stations or positions which the apparatus may take on a curved windshield in practicing the method.

Considering the apparatus first, the wiper assembly is carried by a drive shaft mounted in a support generally shown at 10 (FIGURE 4) by which the arm is also oscillated, the arm itself being generally indicated at 11, and the wiping element or blade generally shown at 12.

The support 10 includes an annular boss 13 which extends upwardly, as from the cowl of an automobile, and journals the drive shaft 14 having a tapered spline section 15 and a threaded end section 16. A plate 17 having an opening to pass the shaft 14 fits over the boss 13 and is held in fixed relation thereto by a nut 18 engaging a threaded sleeve 19 which is integral with and extends from the boss 13. A split wire ring 20 engages a circumferential groove in the shaft 14 and rests against the end of the sleeve 19 to prevent the shaft 14 from falling back. The shaft 14 is oscillated by known means.

The arm 11 consists of an inverted U-shaped channel 21 having sides 23 and having a bottom 22 suitably fixed to the sides. Adjacent the oscillated end of the arm (FIGURE 4), a pair of flanges 24 are pivotally connected to the sides 23 and are joined together by an integral plate 25 having an opening to pass the shaft 14. A spring (not shown) connects plate 25 to the channel to urge the arm 11 to pivot clockwise about the flanges 24 as viewed in FIGURE 4. An inverted cup 26 is fixed to the plate 25 and similarly has an opening to pass the shaft 14. The cup houses a clutch disc 27 having serrated outer edges. A nut 28 is threaded onto the threaded section 16 of the shaft to force the clutch disc 27 into tight engagement with the tapered spline section 15 and the walls of the cup 26 to hold the parts in assembled relation. A cover 29 has wings 30 pivoted to the opposite sides 23 of the channel. In a lowered position, illustrated in FIGURE 4, the cover conceals the structure which connects the arm 11 to the shaft 14.

Figure 3:
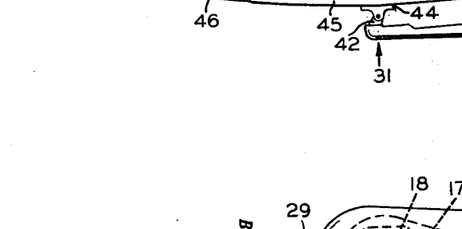
FIGURE 3 is a plan view, with parts broken away and in section, of the wiper arm of FIGURE 2.
Figure 4:
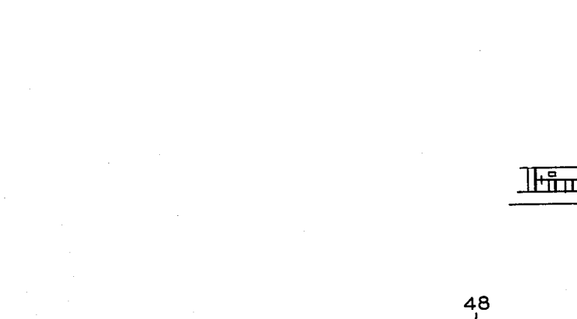
FIGURE 4 is an enlarged side view, partially in section, of the inner end of the arm of FIGURE 3.

The forward end of the arm 11 is enlarged to form a housing 31 (FIGURE 5) having an opening 32 on the underside thereof. The housing contains two cooperating members which, by reason of their structures and relative movement, induce the desired changes in the relationship between the arm and the wiping element or blade. One member 33 extends across the housing 31 and is fixed to the bottom 22 of the arm, as by rivets 33b. Member 33 has a downwardly bent or offset forward or terminal section 33a and a slot 34 which extends longitudinally of the arm for part of the length of the member and then slants to one side, as shown in FIGURE 3, and as indicated at 34a.

The second member 35 underlies the first member 33 and similarly has a downwardly bent or offset section 35a which is pivotally fixed to section 33a by a rivet 36. The axis of this rivet about which the members 33 and 35 turn makes an acute angle with the longitudinal axes of both the arm 11 and the wiping element 12, as more fully described hereinafter. Member 35 also has a slot 37 which extends longitudinally of the arm 11 for part of the length of member 35 and then slants to one side as at 37a, the slot portions 34a and 37a being oppositely directed (FIGURE 3).

A cam follower 38 fits within both slots for longitudinal movement therein. A rod 39 connects to the follower at one end and to a pin 17a on the fixed plate 17 at the other end. A collar 40 fixed to the follower 38 aids in supporting the rod 39.

Figures 5, 6:
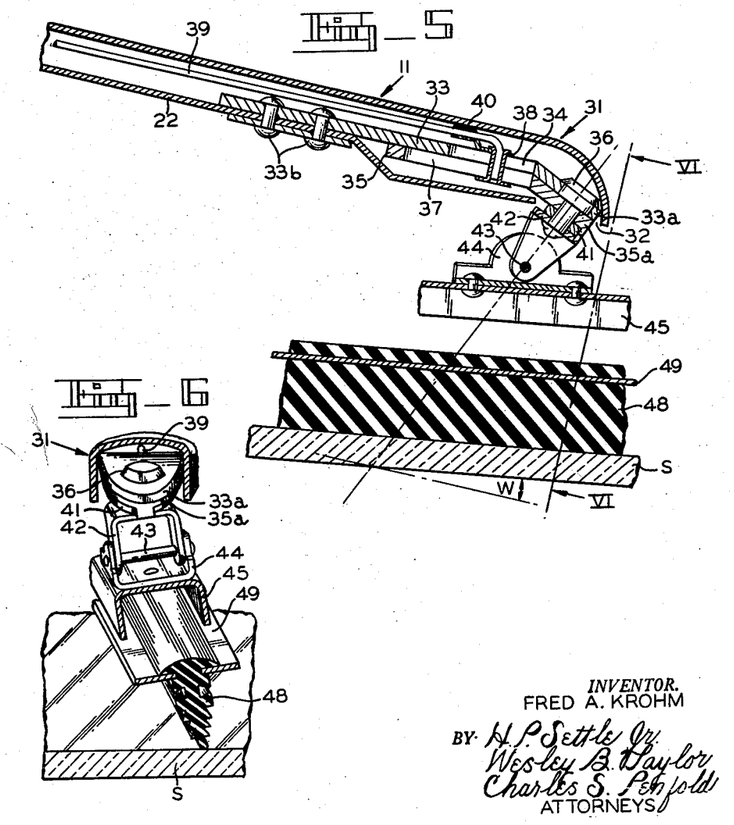
FIGURE 5 is an enlarged longitudinal vertical section taken along the plane V—V of FIGURE 3.
FIGURE 6 is a section of FIGURE 5 on the plane VI—VI and is taken in a direction normal to the plane of the drawing to illustrate a preset tilt of the wiping element with respect to the arm.
Figures 7, 8:
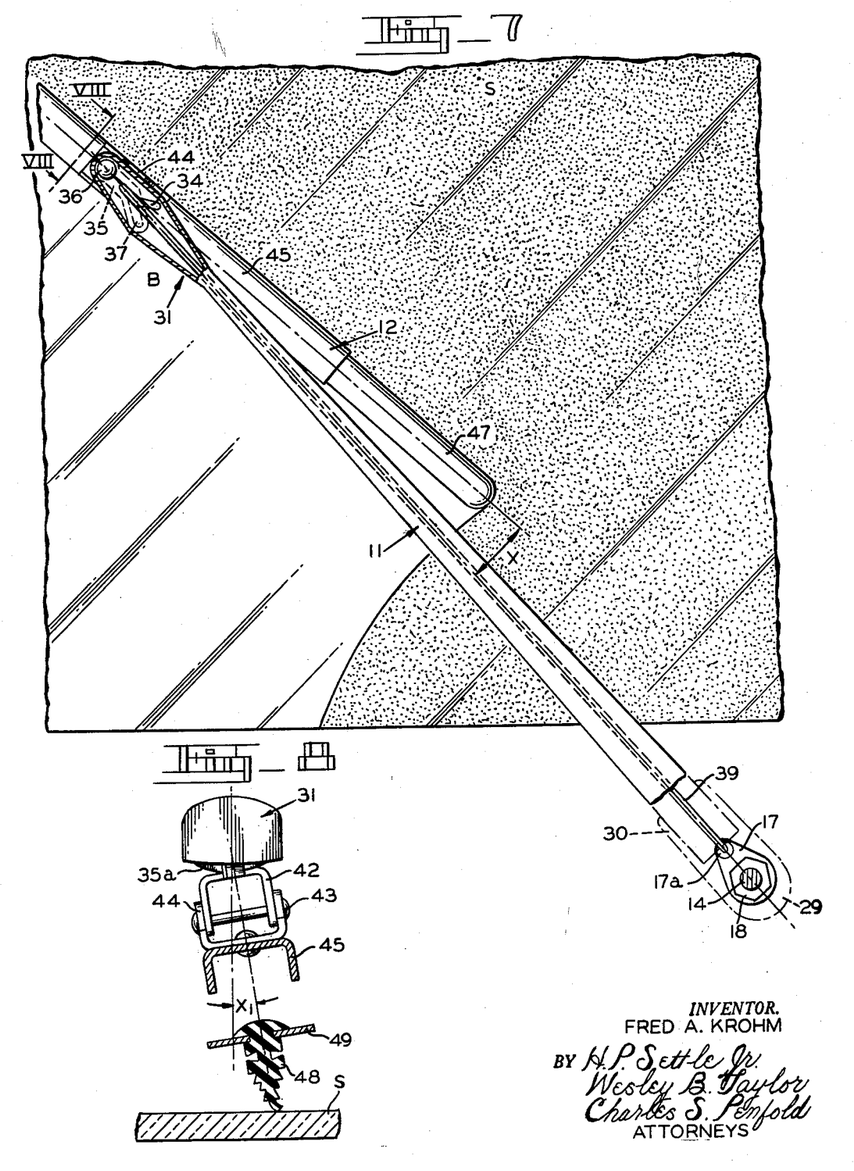
FIGURE 7 is an enlarged fragmentary view of the arm and blade in position B of FIGURE 1.
FIGURE 8 is a section of FIGURE 7 along the plane VIII—VIII.

The rivet 36 also joins a washer 41 and an inverted U-shaped connector 42 to the offset sections 33a and 35a. A pin 43 pivotally joins the legs of the connector to upturned sides of a channel piece 44 which is riveted to the superstructure of the wiping element 12, as shown in FIGURE 6. The wiping element is free to turn about pin 43 to adjust to windshields of varying degrees of slant in a vertical or transverse direction, or to a single windshield having a varying vertical slant in the direction of its length. Such an angle through which the wiping element may turn around pin 43 is illustrated in W in FIGURE 5. A plane parallel to the legs of the connector 42 has a preset angular relation with a plane passing through a longitudinal axis of the arm 11 and perpendicular to the bight of the channel 21, so that the wiping element is placed at an angle X, as shown in FIGURE 7, with respect to this last-mentioned plane even when the follower 38 is at the most outward point within the slots 34 and 37 and the members 33 and 35 are positioned as shown in FIGURE 3, that is, prior to any relative movement therebetween.

The wiping element 12 may be of the type illustrated in U.S. Patent No. 2,596,063 to John W. Anderson. A primary bridge or pressure element 45 (FIGURE 2) has its ends pivotally joined to secondary bridges or pressure elements 46 and 47. The latter carry a rubber blade 48 having a reinforcing strip or flexor 49. This structure is particularly useful in practicing the present method when it is desired to include a step of flexing the outer ends of the wiping blade or element away from the arm 11 to present a concave wiping surface along the length of the blade 48, because the bridges enable the blade readily to assume this flexed position.

*Operation*

Figure 1:
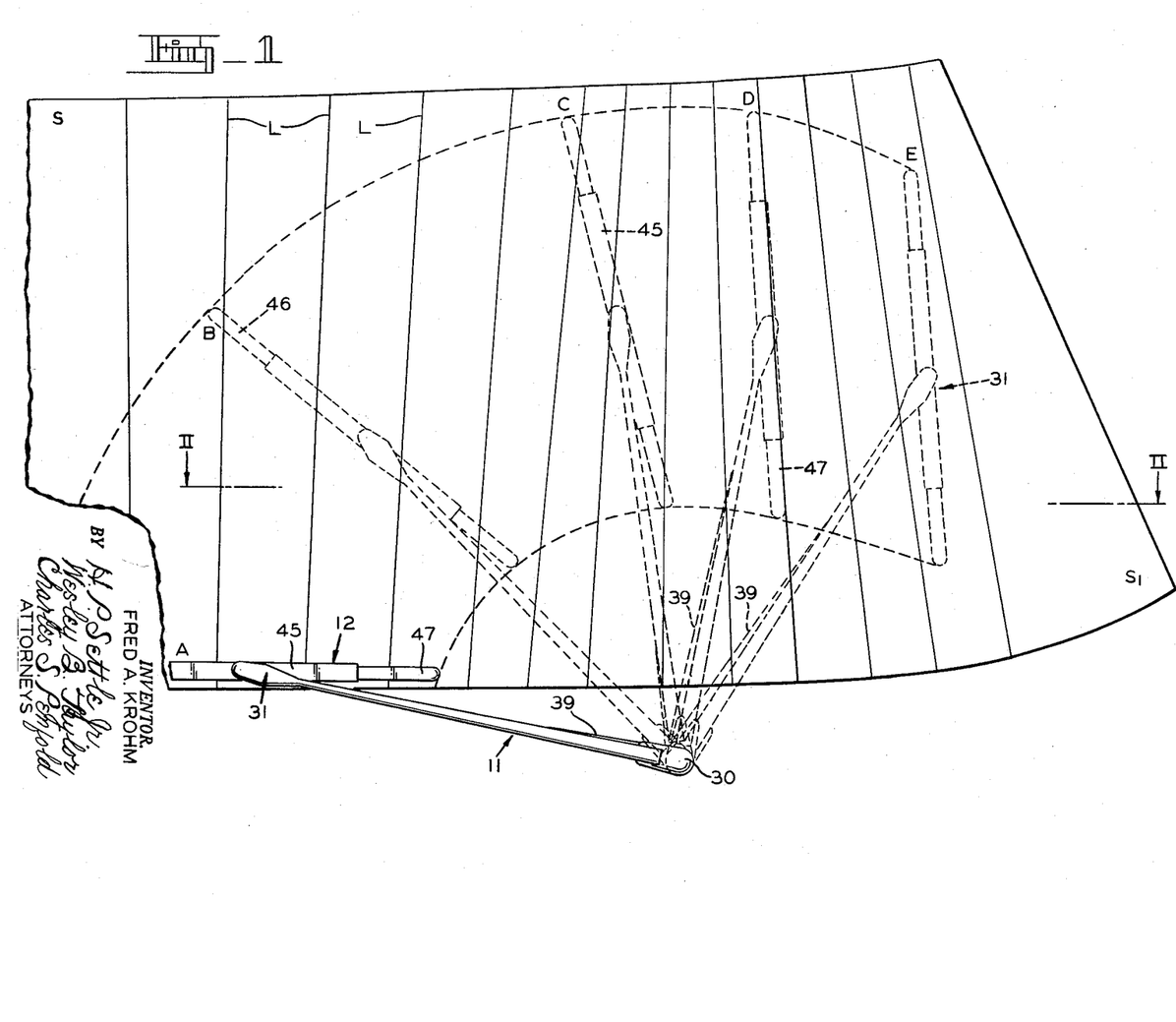
FIGURE 1 is a front view of a curved windshield equipped with a wiper assembly and diagrammatically illustrates some of the positions, designated A through E, which the arm and blade of the assembly may take in wiping the surface in accordance with the present method.

Considering now the use of the apparatus just described in practicing the present method, FIGURE 1 illustrates five arbitrarily chosen positions which the arm 11 and wiping element 12 may take in traversing a curved windshield S. Even though the windshield may curve in a longitudinal horizontal direction, it may be considered as composed of an infinite number of straight lines or vertical elements L placed side by side as is understood in the art. Element lines may be defined as straight lines drawn from and joining points at the intersection of the roof panel and windshield with corresponding points on the cowl section of an automobile. It will be noted that at the relatively flat central portions of the windshield, the element lines are substantially parallel, and, at the corner section of greater curvature, the lines are nonparallel and coverage upwardly. Thus, the central portions may be flat or have a relatively large radius of curvature in a transverse direction of the windshield, while the corner section has a relatively small radius of curvature in the same direction.

Beginning with position A, which represents the most inward station of the arm and blade, the arm 11 pivots clockwise as viewed in FIGURE 1 to move the wiping element in a substantially widthwise direction across the windshield surface S through an arcuate path and toward a laterally or transversely curved end section $S_1$ until position B is reached (FIGURES 1, 7, and 8). During this movement there need be no change in the angular relation between the longitudinal axes of the arm and the wiping element or blade. In the same manner, the preset tilt of the wiping element which defines the angle $X_1$ with a plane passing through a longitudinal axis and perpendicular to the arm 11 may also remain the same while the wiping element moves from position A to position B.

Figure 9:
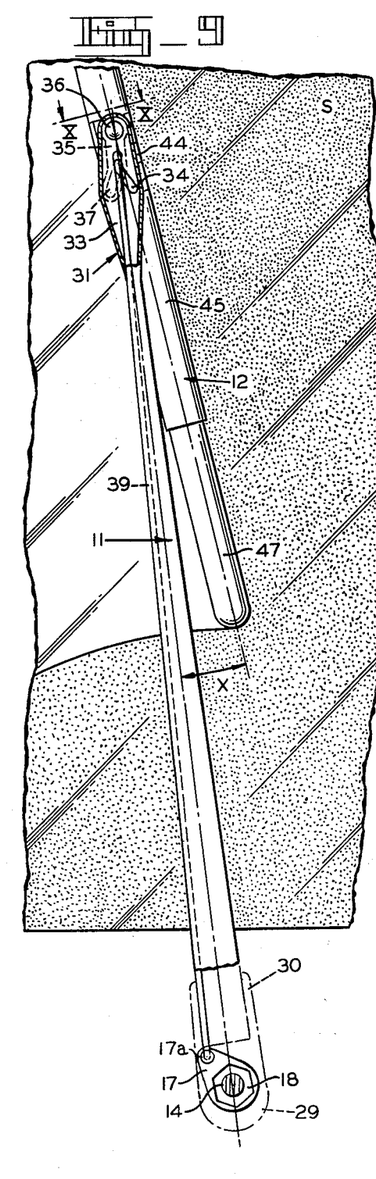
FIGURE 9 is an enlarged fragmentary view of the arm and blade in position C of FIGURE 1.
Figure 10:
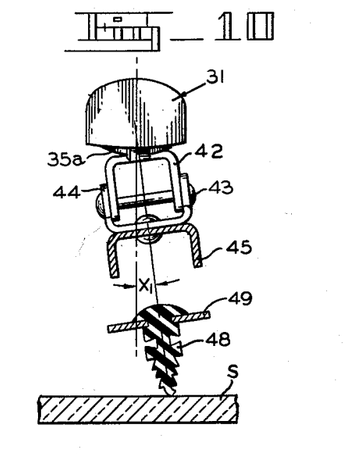
FIGURE 10 is a section of FIGURE 9 along the plane X—X.
Figure 11:
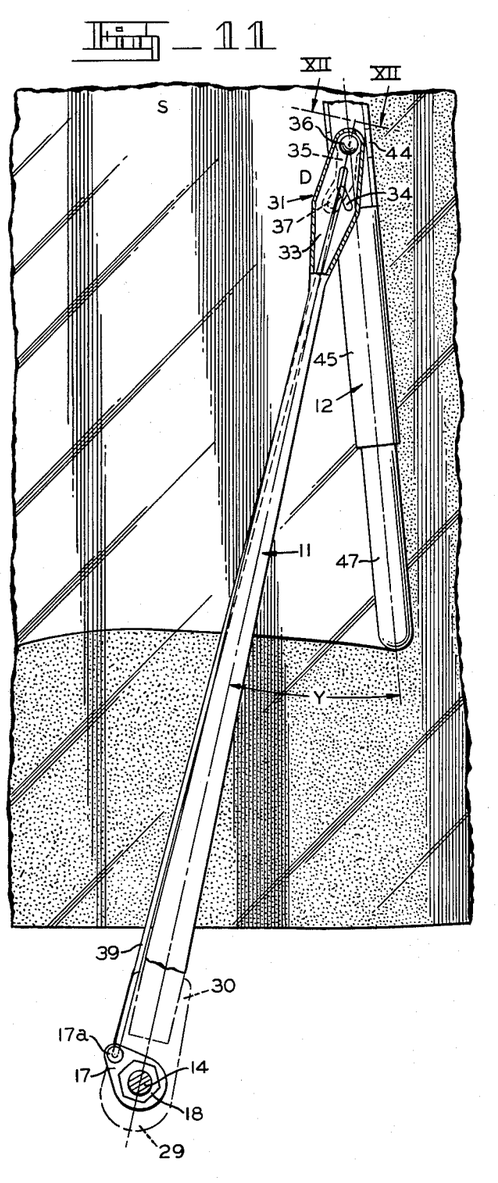
FIGURE 11 is an enlarged fragmentary view of the arm and blade in position D of FIGURE 1.

As the arm 11 continues to move, the wiping element passes from position B to position C (FIGURES 1, 9, and 10). Because the end of the rod 39 is joined to the fixed plate 17 and this continued movement places the housing 31 farther from the pin position connection 17a, the follower 38 is pulled inwardly along the slots 34 and 37. Position C is chosen, since at this point the follower 38 reaches a point where these slots just begin to diverge and, therefore, there is still no relative movement between the members 33 and 35. Accordingly, the angle X between the longitudinal axes of the arm and wiping element or blade and the angle $X_1$ between a plane passing through a longitudinal axis and perpendicular to the wiping element and a plane similarly passing through the longitudinal axis of the arm have not as yet changed.

Figure 12:
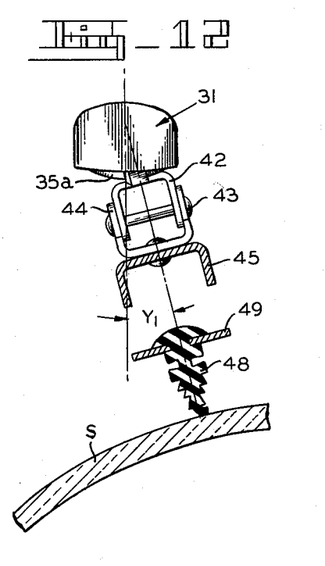
FIGURE 12 is a section of FIGURE 11 along the plane XII—XII.
Figures 13, 14:
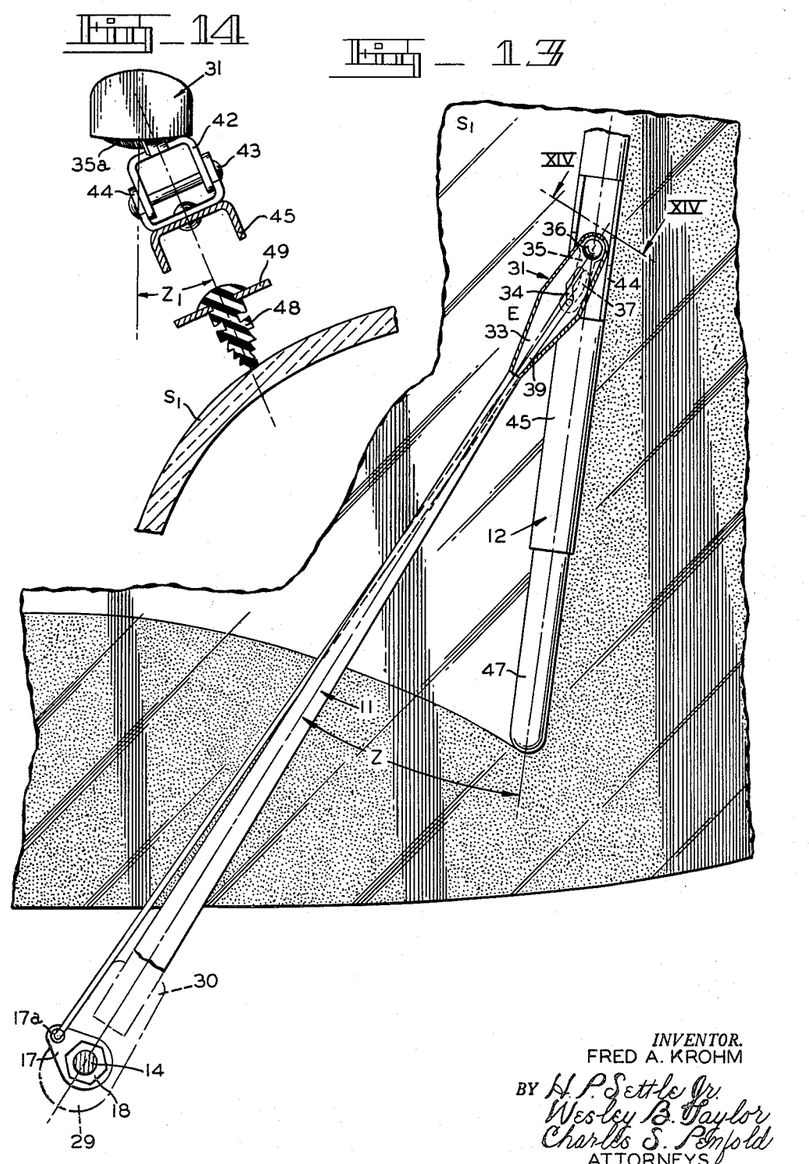
FIGURE 13 is an enlarged fragmentary view of the arm and blade in position E of FIGURE 1.
FIGURE 14 is a section of FIGURE 13 along the plane XIV—XIV.

However, when arm 11 passes from position C to position D (FIGURES 1, 11, and 12), the wiping element is placed in substantial parallelism with the vertical element lines L and remains substantially so throughout the remainder of the wiping stroke. To accomplish this, the relationship between the arm and the wiping element must be changed. As the arm continues to rotate, the follower 38 is pulled into the diverging portions 34a and 37a of the slots 34 and 37, forcing member 35 to pivot about the rivet 36. This produces two important changes. For one, the angle between the longitudinal axes of the arm and wiping element is increased to an angle Y to maintain the wiping element in such substantial parallelism. For the other, as member 35 pivots about member 33, the bent or offset sections 33a and 35a pass over one another and because of their slanted configuration, force the wiping element further to one side. That is, the wiping element is tilted in the direction of its movement to define a new angle $Y_1$ between a plane passing perpendicularly through the wiping element and a plane similarly intersecting the arm 11. As shown in FIGURE 12, this maintains the blade 48 substantially erect against the surface S to provide the desired squeegee action and prevent scratching of the surface by a metal part of the wiper assembly.

In passing from position D to position E (FIGURES 1, 13, and 14), the action just described is continued and becomes more important as the more severely curved end section $S_1$ is traversed. Thus, a still larger angle Z is formed between the longitudinal axes of the arm and wiping element, and a larger angle $Z_1$ is defined between planes passing perpendicularly through the longitudinal axes of the arm and wiping element with the same attendant advantages previously described.

In the embodiment shown, the end portion of the blade 48 are also continuously flexed away from the arm 11 by reason of the previously mentioned bridge construction which transmits an applied force from the arm to medial portions of the secondary bridges 46 and 47. This presents a concave wiping surface along the length of the blade 48 to conform with the curvature of the areas traversed on the surface S.

Although in the embodiment shown and described, the changing of the angle between the longitudinal axes of the arm and wiping element is simultaneously performed with the tilting of the wiping element laterally of a plane passing perpendicularly through the arm, it will be apparent that these two steps of the method need not be performed simultaneously. Instead, these steps can be followed at different times, or they can be performed simultaneously through only part of each step. The timing of these two steps of the invention can be controlled by the design of the two members 33 and 35 and particularly by spacing their offset end sections 33a and 35a so that the latter coact as desired.

It will now be apparent that the present invention provides an improved method of wiping a curved surface, such as a windshield of irregular curvature. By altering the relationship between the longitudinal axes of an arm and wiping element as well as altering the relationship between planes passing perpendicularly through the arm and wiping element, the wiping element is maintained erect against the surface and in substantial parallelism with the vertical elements thereof throughout a portion of the travel of the wiping element across such a surface. This provides an effective squeegee type of wiping action which extends as well around the curved end of a "wrap-around" windshield.

Various details of construction may be changed through a wide range without departing from the principles of this invention, and it is, therefore, not the purpose to limit the patent granted hereon otherwise than necessitated by the scope of the appended claims.

I claim:
1. A method of wiping the surface of a windshield having a first portion and a laterally curved second portion with an elongate wiping element carried by an oscillatable wiper arm comprising: moving the wiping element through the agency of the arm across the surface of the first portion onto the curved second portion, maintaining the wiping element in a substantially normal position with respect to the surface of the first portion during such movement, and then tilting the wiping element about an axis parallel to its longitudinal axis in a direction of its movement and relative to the arm to maintain the wiping element in a substantially normal wiping position as the wiping element passes over the curved section.

2. A method of wiping a surface having a curved end portion with an elongate wiping element carried by an arm, comprising: moving the element through the agency of the arm over part of the surface in a substantially widthwise direction through an arcuate path and toward the curved end portion, continuing to move the element toward and onto the curved end portion while maintaining the element in a substantially perpendicular position with respect to its direction of movement, and then tilting the element forwardly in the direction of its movement and relative to the arm to maintain the element in a normal wiping position while it is moved on said end portion.

3. A method of wiping the outer surface of a windshield having a curved end portion with an oscillatable arm carrying a wiping blade adjacent one end, comprising: moving the arm to move the blade across the outer surface from a position adjacent the center of the windshield through an arcuate path and toward the curved end portion to a position substantially perpendicular to its direction of movement, continuing to oscillate the arm to move the blade toward and onto the curved end portion while simultaneously altering the angle between the longitudinal axes of the arm and blade, and tilting the blade about its longitudinal axis and with respect to the arm while moving the blade onto and through said curved end portion to hold the blade substantially erect against the curved end portion of the windshield surface.

4. A method of wiping the outer surface of a windshield having a horizontally curved end section, a curved frontal section adjacent the end section, with an oscillatable arm provided with a wiping blade adjacent one end, comprising: oscillating the blade through an arcuate path on the frontal section and onto the curved end section while simultaneously altering the angle between the longitudinal axes of the arm and blade and concomitantly with said altering of the angle tilting the blade about its longitudinal axis relative to the axis of the arm in the direction of its movement to hold the blade in a substantially normal position against the windshield surface, and at all times flexing the end portions of the blade away from the arm to present a concave wiping surface longitudinally of said blade to conform with the curvature of the areas traversed on said outer windshield surface.

5. In a method of wiping the outer surface of an elongate windshield having a vertically curved medial section terminating in a horizontally and more severely curved end section wherein an arm oscillatably journalled adjacent one end and provided with an elongate wiping blade adjacent the other end is used to effect the wiping, the steps of altering the relationship between longitudinal axes of the arm and blade and the position of the blade about an axis parallel to its longitudinal axis to maintain the blade erect against the outer surface regardless of the curvature of the area traversed, which include: pivoting the arm to move the blade substantially in a widthwise direction across the medial section of the windshield to place the blade in a position substantially perpendicular to its direction of movement while holding the angle between the longitudinal axes of the arm and blade substantially constant, continuing to pivot the arm to move the blade toward the curved end section and simultaneously changing the angle between the arm and blade to maintain the blade in said substantially perpendicular position, pivoting the blade about an axis substantially parallel to its longitudinal axis in at least one direction of its movement while moving the blade onto and across said curved end portion to hold the blade in a substantially normal position against the outer surface of said curved end portion, reversing the movement of the arm and blade to return the blade to its starting point while performing the foregoing steps in reverse order.

6. The method of moving and controlling a windshield wiper blade on a wiper arm for movement with respect to the surface of a windshield, which consists in pivoting the blade to vary the angularity of its longitudinal axis with respect to the longitudinal axis of the arm and simultaneously forcibly tilting the blade about its longitudinal axis and with respect to the arm to substantially maintain the blade in a normal position to the surface as the arm is moved in a substantially arcuate path across a portion of a windshield.

7. In a method of wiping a windshield of irregular curvature and having a marginal portion of appreciable curvature by the use of a reciprocable arm carrying a wiping blade, the steps of reciprocating the arm to move the blade in a substantially arcuate path across the windshield and toward said marginal portion, maintaining the longitudinal axes of the arm and blade in substantially the same angular relation as long as the blade remains in effective wiping relation with respect to the windshield, then altering the angle between the longitudinal axes of the arm and blade to retain said effective wiping relation, and tilting the blade about an axis parallel its longitudinal axis relative to the arm in at least one direction of its movement as the marginal portion is approached and traversed to hold the blade substantially normal against said marginal portion.

8. In a method of wiping a windshield having irregular curvature and a marginal portion of appreciable curvature with a reciprocable arm provided with a wiping blade adjacent one end and means to pivot the blade with respect to the arm to alter the angle between the longitudinal axes of the arm and blade, the steps of providing a period of lost motion for said pivoting means, pivoting the arm at its opposite end to move the blade in a substantially arcuate path across the windshield and toward said marginal portion and effect a squeegee wipe, actuating said pivoting means and maintaining the longitudinal axes of the arm and blade in substantially the same angular relation by means of said lost motion period, continuing to pivot the arm and arcuate the pivoting means to increase the angle between the longitudinal axes of the arm and blade as the pivoting means begins an effective pivoting action and to maintain the squeegee wipe across the irregularly curved windshield, and tilting the blade about an axis parallel to its longtudinal axis relative to the arm as the marginal portion is approached and traversed to hold the blade substantially normal against said marginal portion.

9. In a method of wiping a windshield surface of variant curvature by the use of an oscillatable arm carrying a windshield wiper blade, the steps of interconnecting the arm and the blade for relative movement about an axis lying in the longitudinal vertical plane of the arm and inclined at an acute angle with respect to the axis of the arm, and traversing said arm and blade in a direction widthwise of the blade across the surface of the windshield and effecting relative movement therebetween about said axis to vary the angular relationship between the axes of the arm and the blade in two directions to conform the edge of the blade to the windshield surface and to retain the edge of the blade substantially normal to said surface.

10. A method of wiping, with an elongate wiping element carried by an arm, a surface having a recedingly curved end portion, comprising: moving the element by the arm over a part of the surface in the direction of the end portion through a generally arcuate path, pivoting the element with respect to the arm while continuing to move it toward and onto the end portion and tilting the element about an axis parallel to its longitudinal axis in the direction of its movement to maintain it substantially normal to the surface while it is moved across said end portion.

11. The method of wiping a surface with a blade which comprises an elongate support and a wiping element and which is carried by a wiper arm, which consists in moving the arm and blade so the blade will travel substantially widthwise on the surface and tilting the blade about its longitudinal axis relative to the arm for at least some distance during such travel to substantially maintain the blade normal to such surface.

12. The method of wiping a curved surface with a blade which is resiliently flexible in a plane substantially perpendicular to the surface and which is pivotally carried by an arm, which consists in directing the arm so the blade travels substantially widthwise on the surface and tilting the blade about its longitudinal axis relative to the arm to maintain the blade normally erect with respect to said surface during such travel.

13. The method of wiping a curved surface with a blade which is resiliently flexible in a plane relatively perpendicular to the surface and which is carried by an arm, which consists in directing the arm so the blade travels substantially widthwise on the surface, and forcibly tilting and pivoting the blade relative to the arm to maintain the blade in a normal condition so it will readily conform to the surface during such travel.

14. The method of controlling an elongate windshield wiper blade relative to an elonagte wiper arm which consists in pivoting the blade crossways with respect to the longitudinal axis of the arm, tipping the longitudinal axis of the blade relative to a plane containing the longitudinal axis of the arm, and tilting the blade about an axis parallel to its longitudinal axis through a portion of an arcuate path of movement of the blade and arm.

15. The method of wiping a surface comprising the steps of moving the arm and blade about an axis so that the blade travels substantially widthwise on the surface, pivoting the blade crossways of the arm during a portion of its path of travel, and simultaneously tilting the blade about an axis parallel to its longitudinal axis with respect to the arm during the same portion of its path of travel.

16. The method of wiping the surface of a curved windshield having a frontal portion and a lateral portion wherein the lateral portion is more severely curved than the frontal portion comprising the steps of: oscillating an arm and a blade across the portions of the windshield with the wiper in contact therewith and wherein the wiper is carried by the arm about a fixed axis disposed at an oblique angle with respect to the axis of the arm and lying in a vertical plane on the arm, maintaining the blade in a wiping position normal to the surface of the frontal portion as the blade passes thereover, maintaining the blade in a wiping position normal to the surface of a lateral portion as the blade passes thereover by pivoting said wiper about said fixed oblique axis and thereby tilting said blade about an axis generally parallel to the longitudinal axis of the blade and relative to the arm.

References Cited by the Examiner
UNITED STATES PATENTS

| | | | |
|---|---|---|---|
| 2,324,365 | 7/43 | Coutts | 15—250.4 |
| 2,356,424 | 8/44 | Paton | 15—250.23 |
| 2,500,010 | 3/50 | Schoon | 15—250.09 |
| 2,596,063 | 5/42 | Anderson | 15—250.42 |
| 2,691,186 | 10/54 | Oishei et al. | 15—250.21 |
| 2,809,388 | 10/57 | Wise | 15—250.23 |
| 2,979,425 | 4/61 | Krohm | 134—6 |
| 3,006,788 | 10/61 | Krohm | 134—6 |

FOREIGN PATENTS

| | | |
|---|---|---|
| 1,047,648 | 7/53 | France. |

CHARLES A. WILLMUTH, *Primary Examiner.*

UNITED STATES PATENT OFFICE
CERTIFICATE OF CORRECTION

Patent No. 3,180,758 April 27, 1965

Fred A. Krohm

It is hereby certified that error appears in the above numbered patent requiring correction and that the said Letters Patent should read as corrected below.

Column 3, lines 74 and 75, for "relation ship" read -- relationship --; column 4, line 73, for "coverage" read -- converge --; column 5, line 21, strike out "position"; line 37, strike out "the", second occurrence; line 41, for "rivet 36:" read -- rivet 36. --; line 66, for "portion" read -- portions --.

Signed and sealed this 28th day of September 1965.

(SEAL)
Attest:

ERNEST W. SWIDER
Attesting Officer

EDWARD J. BRENNER
Commissioner of Patents